Figure 1:
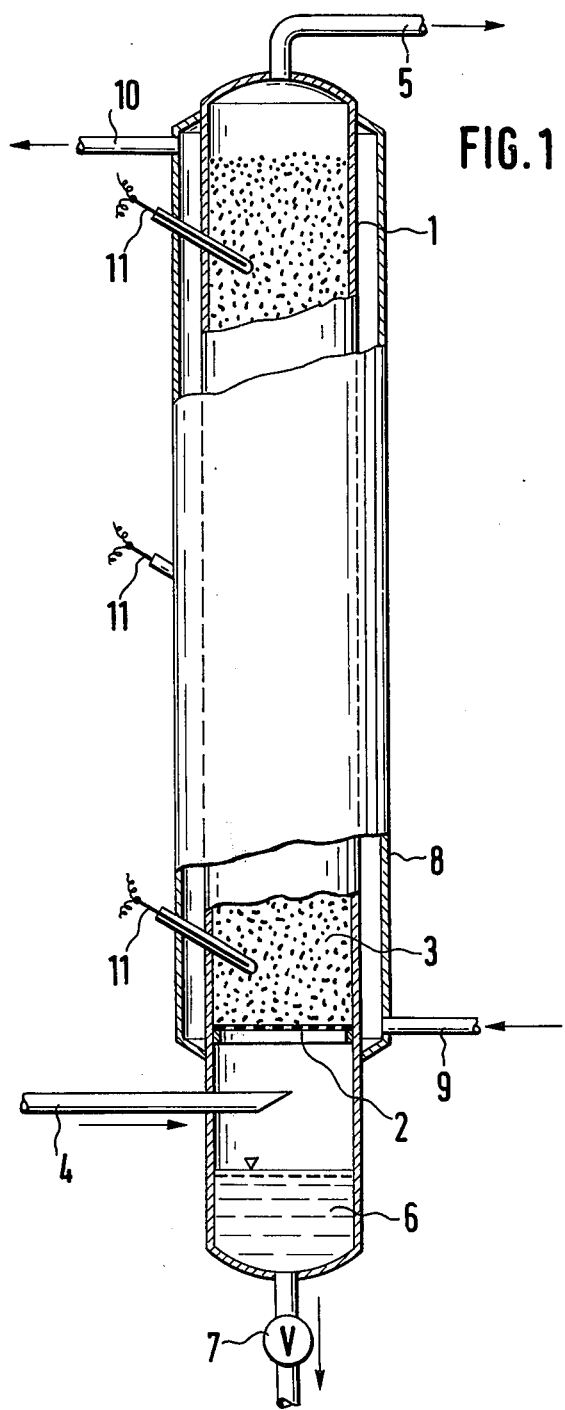

United States Patent [19]

Feser et al.

[11] 4,061,723

[45] Dec. 6, 1977

[54] PROCESS FOR PREPARING CONCENTRATED TETRAFLUOROBORIC ACID

[75] Inventors: Manfred Feser, Frankfurt am Main; Egon Joerchel, Hochheim, Main; Jürgen Korinth, Hofheim, Taunus, all of Germany

[73] Assignee: Hoechst Aktiengesellschaft, Frankfurt am Main, Germany

[21] Appl. No.: 741,399

[22] Filed: Nov. 12, 1976

[30] Foreign Application Priority Data

Nov. 15, 1975 Germany .............................. 2551433

[51] Int. Cl.$^2$ ............................................ C01B 35/06
[52] U.S. Cl. .................................................... 423/276

[58] Field of Search ..................... 423/276, 240, 293

[56] References Cited

U.S. PATENT DOCUMENTS

| | | | |
|---|---|---|---|
| 2,526,777 | 10/1950 | Smith et al. | 423/240 X |
| 3,353,911 | 11/1967 | Moller et al. | 423/240 X |
| 3,920,825 | 11/1975 | Becher et al. | 423/276 |
| 3,995,005 | 11/1976 | Teller | 423/240 X |

*Primary Examiner*—G. O. Peters
*Attorney, Agent, or Firm*—Curtis, Morris & Safford

[57] ABSTRACT

Process for the preparation of a concentrated tetrafluoroboric acid from boron/oxygen compounds and hydrogen fluoride by reacting a solid boron/oxygen compound with a hydrogen fluoride-containing gas.

10 Claims, 2 Drawing Figures

PROCESS FOR PREPARING CONCENTRATED TETRAFLUOROBORIC ACID

The present invention relates to the preparation of concentrated tetrafluoroboric acid.

Tetrafluoroboric acid is generally prepared by reacting hydrofluoric acid of 40 to 50% strength with a slight excess over the calculated quantity of boric acid while intensively cooling according to the reaction equation:

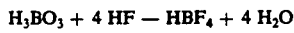

$$H_3BO_3 + 4 HF \longrightarrow HBF_4 + 4 H_2O$$

The crude tetrafluoroboric acid containing considerable quantities of water in said process is purified in complicated manner in most cases. In order to obtain tetrafluoroboric acid of high strength, there must be used as starting compounds reactants containing as little water as possible, especially anhydrous hydrogen fluoride, crystalline boric acid, metaboric acid, or boron trioxide. As the reaction takes a highly exothermal course (27.7 Kcal are set free during the reaction of 1 mol of boric acid), difficulties arise for dissipating the quantities of heat set free when adding solid boric acid to hydrofluoric acid. For this reason only absorption processes for HF using aqueous solutions of boric acid have been known hitherto.

In U.S. Pat. No. 3,353,911 there is disclosed a process in which a gaseous mixture consisting of hydrogen chloride, hydrogen fluoride and hydrogen halide compounds is reacted with a diluted aqueous boric acid solution.

U.S. Pat. No. 3,016,285 describes the selective absorption of hydrogen fluoride from gas mixtures containing $SO_2$ and HF by means of boric acid solutions in a spray tower.

According to French Pat. No. 1,427,940 potassium fluoride is added to the aqueous absorption solution of boric acid in order to improve the absorption of hydrogen fluoride.

Therefore, potassium tetrafluoroborate is formed. In all cited processes there are formed only diluted solutions of tetrafluoroboric acid containing moreover considerable quantities of an excess of free boric acid, owing to the fact that the end of the reaction can only be difficultly determined.

According to German Pat. No. 2,239,131 gases containing hydrogen fluoride are reacted with a solution of solid boric acid in tetrafluoroboric acid of high strength. This process certainly permits preparation of highly concentrated solutions of tetrafluoroboric acid, but the forced circulation of hydroxyfluoroboric acid makes necessary the use of specialized apparatus.

A process for the preparation of highly concentrated tetrafluoroboric acid has now been found that involves reacting hydrogen fluoride with boron/oxygen compounds, which comprises reacting a solid boron/oxygen compound directly with hydrogen fluoride-containing gases. Suitable boron/oxygen compounds are especially boric acid, metaboric acid and boron oxide. The gas used may contain further components besides hydrogen fluoride, for example fluorine-containing hydrocarbons, fluorochloro-alkanes, sulfur dioxide, hydrogen chloride or inert gases such as nitrogen.

The process according to the invention permits both the preparation of highly concentrated tetrafluoroboric acid and a simultaneous substantially selective removal of hydrogen fluoride from the gases used. The content of hydrogen fluoride of the gases used is not critical for the reaction. It may be in the range of 0.03 to 100% by volume. Surprisingly, the quantities of heat set free may readily be dissipated. Up to a content of 20% by volume of HF the heat set free is absorbed by the residual gas and dissipated. The process may, consequently, be carried out in especially good manner with contents of hydrogen fluoride of this order of magnitude, especially of about 0.05 to 10% by volume. External cooling with water is indicated for contents of hydrogen fluoride of more than 20% by volume.

The form of the reaction vessel is not critical. Tubular reactors are especially suitable. Horizontally arranged tubular reactors, for example, may be used, provided that they permit the withdrawal of the $HBF_4$ produced through openings in the reactor shell at the lowest portion of the bottom thereof. The process according to the invention may be carried out especially advantageously when using vertical tubular reactors. Thereby the hydrogen fluoride-containing gas is suitably introduced at the bottom. The gases liberated from HF leave the reactor at the upper part. The tetrafluoroboric acid is obtained as an aqueous solution, which consequently, collects at the bottom. By introducing the hydrogen fluoride-containing gas at the top there is obtained a tetrafluoroboric acid containing considerable quantities of hydroxyfluoroboric acids, as may be seen from the F/B ratio.

The dimensions of the reaction vessel are not critical for the process of the invention either. They should however be such that they permit a control of the temperature increase caused by the quantity of hydrogen fluoride introduced per unit of time. Aqueous concentrated tetrafluoroboric acid begins to decompose at a temperature of about 140° C. The reaction is therefore advantageously performed at a temperature below 140° C, preferably below 110° C, especially below 80° C. A temperature greater than 10° C, especially of 20° to 30° C is especially suitable.

The particle size of the corresponding boron/oxygen compounds may vary within wide limits. Products having a particle size of 0.5 to 5 mm may be used, for example. Greater particle sizes make a lengthening of the reactor necessary, owing to the fact that the characteristic reactivity of the compounds would be reduced in this case. When the particle sizes are too small there is the danger of a blowing out of the reactive boron compound by the gas current introduced. The reaction may be carried out continuously or discontinuously.

The invention will now be described, by way of example, with reference to the accompanying drawings which show diagrammatically an apparatus suitable for the carrying out the process of the invention.

FIG. 1 shows a possible arrangement of a vertical tubular reactor for discontinuous operation. The reactor is composed of a cylindrical tube 1 consisting of a material resistant to hydrogen fluoride, for example nickel, polyethylene or polypropylene, which contains a perforated plate 2, on which a charge 3 of the reacting boron/oxygen compound, for example boron acid, is placed. The hydrogen fluoride-containing gas is introduced into the reactor via conduit 4. The gases liberated from HF leave at the top of the reactor via conduit 5. Tetrafluoroboric acid formed during the reaction accumulates in the lower part of the reactor as a liquid phase 6. It is withdrawn through a valve 7 continuously or discontinuously. The heat generated during the reaction may be dissipated by a cooling jacket 8 provided with an inlet 9 for cooling water and an outlet 10 for heated cooling water. The reaction course may be observed by means of thermometers 11. When the diameter of the cylinder is less than about 10 cm, the boron/oxygen compound will not move downwardly. In this case an increase of the temperature at the highest measuring point 11 indicates that the reactor must be charged anew. The consumption of boric acid, boron trioxide or methaboric acid may also be previously calculated from the hydrogen fluoride content of the gases used.

In the case of rather large tube diameters the charging with boric acid and the formation of tetrafluoroboric acid may also be carried out continuously. When working continuously two reactors may also be operated alternately.

The process according to the invention permits reduction of the hydrogen fluoride content of the gases leaving the reactor to about 0.025% by volume. Hydrogen chloride is absorbed only in very small quantities in the process according to the invention. The present invention is therefore especially suitable for removing HF from crude gases as obtained in the course of the fluorination of organic compounds, especially of gases containing hydrogen chloride obtained in the preparation of fluorochlorohydrocarbons. In the industry hydrochloric acid and hydrogen fluoride are frequently absorbed in lyes. In this way the waste gas is certainly purified, but there are formed inorganic halogen compounds which are practically of no use. The process according to the invention produces tetrafluoroboric acid as a useful product.

When the feed gas contains HCl besides HF small quantities of dissolved hydrochloric acid (about 0.5% of HCl) can be found in the tetrafluoroboric acid, which can be removed by blowing it out with an inert gas, for example air, oxygen or nitrogen down a content of 0.005% or less. When using gases containing, besides hydrogen fluoride and hydrochloric acid fluorinated hydrocarbons, for example $CF_2Cl_2$, the fluorocarbon chloride liberated from HF and HCl is advantageously used for blowing out.

Figure 2:
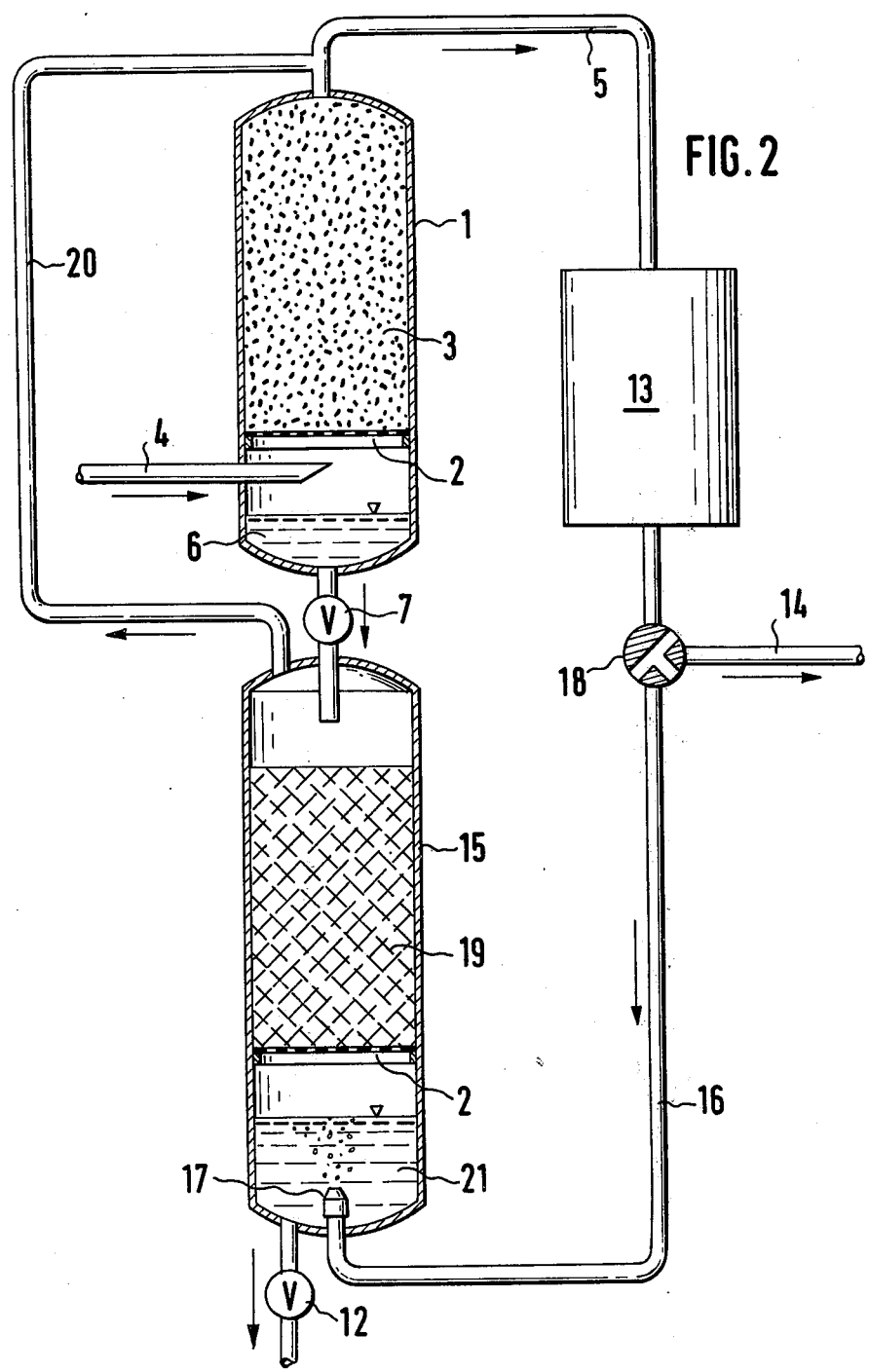

FIG. 2 shows a possible manner for carrying out the blowing out process.

The apparatus shown in the figure is composed of an upper absorption chamber 1 for HF and blowing chamber 15 for HCl. The hydrogen fluoride containing crude gas is introduced into the reactor by the gas introduction tube 4. The gas passes through the charge of boric acid 3 placed on a perforated plate or a network 2. The gas current free from HF leaves the absorption chamber 1 via conduit 5. HCl is thereafter removed from said gas current in the washer 13. Water may be introduced in known manner into said washer through a nozzle (not shown in the figure). This water is withdrawn after having absorbed HCl in the form of an aqueous hydrochloric acid (not shown in the figure). A part of the gas current thus purified from hydrogen halides is withdrawn by means of a three-way cock 18 via conduit 14. The remaining part of the purified gas is conducted to the lower portion of the blowing chamber 15 via conduit 16 and introduced through a nozzle 17.

Tetrafluoroboric acid formed in the absorption chamber 1 trickles to the bottom of the reactor where it collects in the form of a liquid 6. This tetrafluoroboric acid 6 still containing hydrogen chloride is withdrawn through a valve into the expulsion chamber 15 containing packing 19, for example of annular shape. In said chamber the crude gas free from hydrogen fluoride, which has been fed to the reactor via 17 meets with the hydrochloric acid-containing tetrafluoroboric acid in a counter-current flow, is saturated with HCl and leaves the blowing chamber 15 at the upper part via conduit 20. Conduit 20 discharges into conduit 5. A body of $HBF_4$ 21 practically free from hydrochloric acid collects at the lower bed of the blowing chamber 15. It is withdrawn continuously or discontinuously via the valve 12.

The invention may also be used when the gases containing hydrogen fluoride are obtained discontinuously, for example for the purification of receptacles, in which HF had been stored. The purification may be carried out in such a way that air is drawn in through the receptacle. The current of air containing hydrogen fluoride may then pass through the reactor as described above and be liberated from HF.

The tetrafluoroboric acid obtained in the process of the invention is free from boric acid or hydroxyfluoroboric acid. The process may be carried out in a wide pressure range, for example under a pressure of 0.3 to 30 bars, especially of 0.5 to 3 bars. The upper limit of the working pressure is determined only by economic reasons (compression energy). On the other hand, with increasing working pressure the removal of HF from the gas is improved.

When using gases containing small amounts of HF, for example of 1 to 10%, it becomes evident that the concentration of the tetrafluoroboric acid obtained is higher than when using gases containing much HF. This may be attributed to the water vapor content of the major portion of inert gas leaving the apparatus.

The following examples illustrate the invention:

EXAMPLE 1

The reactor used was a vertical polyethylene tube of 70 cm length having an inner diameter of about 5.5 cm (cf. FIG. 1). The tube was charged with 1000 g of boric acid granules (having an average particle size of 2 to 3 mm) which were supported by a wire network. A mixture of 50% by volume of HF and 50% by volume of nitrogen having a temperature of 20° C entered in the reactor at its lower end through a feed tube, at a rate of 280 liters per hour. The temperature during the reaction rose from about 20° C to about 80° C, first at the lower measuring point, thereafter at the middle measuring point and finally at the upper measuring point, 2196 g of aqueous fluoroboric acid had trickled to the bottom (concentration about 61%) after 10 hours, which corresponds to a yield of more than 99% of the theory, calculated on hydrogen fluoride used. The content of hydrogen fluoride of the waste gas was 0.04% by volume.

EXAMPLE 2

The Example was carried out as Example 1, except that the reactor was filled with 1000 g of $B_2O_3$ instead of boric acid. The temperature in the reaction zone thereby rose to about 85° C. After 10 hours 1779 g of aqueous fluoroboric acid (concentration of 76.5%) were obtained. This corresponds to a yield of more than 99% of the theory.

EXAMPLE 3

The Example was carried out by introducing the gas current of Example 1 into the apparatus of Example 1 except that the reactor was filled with 1000 g of $HBO_2$ instead of boric acid. After 10 hours 1930 g of aqueous fluoroboric acid (concentration of 71%) were obtained.

EXAMPLE 4

The reactor of Example 1 was charged with 1000 g of boric acid. A gas mixture was introduced thereto containing, besides fluorochlorohydrocarbons ($CF_2Cl_2$ and $CFCl_3$), up to 30% by volume of HF and 35 to 50% by volume of HCl. A fluoroboric acid was obtained having a strength of about 61.6%. The temperature increase caused by the reaction was about 10° C. The concentration of hydrogen fluoride in dependence of the composition of the crude gas used may be seen in Table 1.

TABLE 1

| Composition of the crude gas (% by volume) | | | HF in the waste gas (% by volume) |
| --- | --- | --- | --- |
| $CF_2Cl_2$ + $CFCl_3$ | HCl | HF | |
| 35 | 35 | 30 | 0.05 |
| 42.5 | 42.5 | 15 | 0.025 |
| 47 | 47 | 6 | 0.025 |
| 49.7 | 49.7 | 0.6 | 0.025 |

EXAMPLE 5

Example 4 was repeated with boron oxide. A $HBF_4$ of 76% strength was obtained. The waste gas contained from 0.025 to 0.05% by volume of HF.

EXAMPLE 6

Example 4 was repeated with methaboric acid ($HBO_2$). $HBF_4$ of 71% strength was obtained. The waste gas contained from 0.025 to 0.05% by volume of HF.

EXAMPLE 7

The reactor of Example 1 was filled with boric acid. There was introduced a gas mixture containing about 30% by volume of HF and 70% by volume of air. The pressure was about 460 mbars. Tetrafluoroboric acid of 61% strength was obtained.

When repeating the example in the same manner, but with $HBO_2$ or $B_2O_3$ instead of boric acid, the final concentration of $HBF_4$ is 71% and 76% respectively.

EXAMPLE 8

An aqueous solution of tetrafluoroboric acid was produced as in Example 4 by means of a gas current containing about 42.5% by volume of HCl. In order to remove the dissolved hydrogen chloride (about 0.05% by weight of HCl) a nitrogen current was introduced through a nozzle into 50 g of aqueous $HBF_4$ placed in a plastic bottle at a rate of 50 to 200 liters per hour. Thereafter the content of HCl had dropped below 0.005% by weight.

EXAMPLE 9

The procedure of Example 1 was repeated with a gas mixture containing only 1% of HF besides nitrogen. A temperature increase could not be observed. The tetrafluoroboric acid trickling to the bottom had a strength of about 66 to 67%. (The escaping nitrogen contained water vapor).

What is claimed is:

1. A process for the preparation of tetrafluoroboric acid which comprises bringing a gas containing hydrogen fluoride into contact with a solid boron/oxygen compound to form concentrated tetrafluoroboric acid and separating said tetrafluoroboric acid from said solid boron/oxygen compound.

2. A process for the preparation of tetrafluoroboric acid which comprises passing a gas containing hydrogen fluoride through a bed of granular boron/oxygen compound to form concentrated tetrafluoroboric acid and recovering said tetrafluoroboric acid from said bed of granular material.

3. A process according to claim 2 wherein said gas is passed upwardly through the bed of granular boron/oxygen compound.

4. A process according to claim 2 wherein said tetrafluoroboric acid is collected at a point below said bed.

5. A process according to claim 1 wherein said boron/oxygen compound is selected from boric acid, metaboric acid ($HBO_2$) and boron oxide.

6. A process according to claim 1 wherein said gas contains from 0.05 to 10% by volume of hydrogen fluoride.

7. A process according to claim 1 wherein the reaction between the gas and solid is carried out at a temperature of up to 140° C.

8. A process according to claim 1 wherein said gas is maintained under a pressure of 0.5 to 3 bars.

9. A process according to claim 1 wherein the gas contains in addition to hydrogen fluoride a compound selected from fluorohydrocarbons and hydrogen chloride.

10. A process according to claim 1 wherein said gas contains both hydrogen fluoride and hydrogen chloride, the tetrafluoroboric acid obtained has hydrogen chloride dissolved therein, and the hydrogen chloride is removed from the tetrafluoroboric acid by blowing with an inert gas.

* * * * *